(12) United States Patent
Chiarini et al.

(10) Patent No.: US 10,095,015 B2
(45) Date of Patent: Oct. 9, 2018

(54) TELESCOPE, COMPRISING A SPHERICAL PRIMARY MIRROR, WITH WIDE FIELD OF VIEW AND HIGH OPTICAL RESOLUTION

(71) Applicant: CGS SPA COMPAGNIA GENERALE PER LO SPAZIO, Milan (IT)

(72) Inventors: Marco Chiarini, Faenza (IT); Lorenzo Cibin, Trecate (IT); Roberto Ragazzoni, Rome (IT)

(73) Assignee: OHB ITALIA S.P.A., Milan (IT)

( * ) Notice: Subject to any disclaimer, the term of this patent is extended or adjusted under 35 U.S.C. 154(b) by 305 days.

(21) Appl. No.: 14/431,315

(22) PCT Filed: Sep. 19, 2013

(86) PCT No.: PCT/EP2013/069417
§ 371 (c)(1),
(2) Date: Mar. 26, 2015

(87) PCT Pub. No.: WO2014/048820
PCT Pub. Date: Apr. 3, 2014

(65) Prior Publication Data
US 2015/0241677 A1 Aug. 27, 2015

(30) Foreign Application Priority Data

Sep. 28, 2012 (IT) ............ CS2012A000034
Aug. 29, 2013 (IT) ............ CS2013A000022

(51) Int. Cl.
*G02B 23/02* (2006.01)
*G02B 17/08* (2006.01)
(Continued)

(52) U.S. Cl.
CPC .......... *G02B 17/08* (2013.01); *G02B 5/09* (2013.01); *G02B 17/0884* (2013.01); *G02B 23/02* (2013.01); *G02B 23/06* (2013.01)

(58) Field of Classification Search
CPC .......... B64G 1/363; B64G 1/365; G01J 5/20; G01N 21/538; G01S 17/88; G01S 3/7867;
(Continued)

(56) References Cited

U.S. PATENT DOCUMENTS 3,799,646 A * 3/1974 Footchkar ............ G02B 5/124
359/546
3,829,192 A * 8/1974 Wheeler ............... H04N 3/09
250/334

(Continued)

*Primary Examiner* — Bumsuk Won
*Assistant Examiner* — Balram Parbadia
(74) *Attorney, Agent, or Firm* — Mark M. Friedman (57) ABSTRACT

Telescope with optical resolution and continuity of the field of view comprising a spherical primary mirror, wherein: a) said telescope is equipped with a field of view and a system of repartitioning the field of view, b) said system of repartitioning the field of view is placed in proximity of die focus of the primary mirror, and is constituted by a secondary mirror composed of n planar reflective surfaces, c) said n planar reflective surfaces are contiguous sine to the other and form a continuous multifaceted prismatic reflector, so as to obtain continuity of the field of view over the whole field, d) said n planar reflective surfaces are followed by a corresponding number of optical cameras that form n portions of image in n distinct focal planes, and e) a collecting and recording element is positioned on each n-th focal plane.

9 Claims, 4 Drawing Sheets

(51) Int. Cl.
*G02B 5/09* (2006.01)
*G02B 23/06* (2006.01)

(58) Field of Classification Search
CPC ... G01S 3/7868; G01S 7/4812; G02B 17/061;
G02B 17/0694; G02B 17/0884; G02B
23/00; G02B 23/02; G02B 23/06; G02B
5/09; G03B 37/04
See application file for complete search history.

(56) References Cited

U.S. PATENT DOCUMENTS

| | | | | |
|---|---|---|---|---|
| 4,141,652 A | * | 2/1979 | Feinleib | G01J 9/00 250/201.9 |
| 4,486,662 A | * | 12/1984 | Abel | H04N 3/09 250/334 |
| 6,066,850 A | * | 5/2000 | Hersom | B64G 1/22 244/171 |
| 6,459,818 B1 | * | 10/2002 | George | G06T 5/003 382/254 |
| 2009/0015914 A1 | * | 1/2009 | Duncan | B64G 1/105 359/399 |

* cited by examiner

TELESCOPE, COMPRISING A SPHERICAL PRIMARY MIRROR, WITH WIDE FIELD OF VIEW AND HIGH OPTICAL RESOLUTION

TECHNICAL FIELD OF THE INVENTION

The large number of debris around Earth is a risk for the operative satellites and space vehicles safety also considering that its number is rapidly increasing. Therefore the major Space Agencies as well as many Public and Industrial Subjects operating in the Space domain are dedicating increasing efforts to this topic—which makes part of the more general Space Situational Awareness (SSA) thematic—due to the great concerns it creates for future Space access and exploitation.

At the present state of the art it is very important to monitor space debris with different methods and to know their orbits in order to prevent collisions. To center this target it is necessary to build as soon as possible very deep coverage catalogues of objects orbiting in the Near Earth Space, characterized also by very reduced dimensions, down to some centimeter in diameter for lower orbital regions.

The classical approach is to use radar observations for low altitude debris and optical observations for high altitude debris. Even for LEO orbits, which is the application requiring the most stringent performances, the introduction of optical based observation stations as a support tool for radar systems, can be effective in meeting SSA requirements while to contain the costs, implied by the implementation and maintenance of complex radar apparatuses. In particular many studies have demonstrated that beyond 1000-1100 km altitude, radar apparatuses become quite demanding to be applied due to the huge amounts of energy to be released, leading on one hand to overwhelming costs of deployment and operation, and, on the other hand, due to a paramount series of problems concerning environmental safety and security.

The advantage of the optical solution comes from several considerations. The main physical difference between radar observations and optical observations is not only limited to the wavelength of the received signal, but rather in the type of illumination of the observed object. In the radar sensor the target is actively illuminated by the radar signals, whereas an optical sensor is based, on the contrary, on the passive reception of light scattered from the object illuminated by the Sun. The advantage of optical observations is precisely in the possibility of exploiting the abundant radiation provided for free by the Sun. In particular the performances advantage of optical based sensors arises from the fact that the intensity of illumination of the receiving surface is inversely proportional to the square of the distance between the target and the optical observer, whereas for radar technology this is proportional to the inverse of the fourth power of the distance. Further, an optical sensor detects a signal characterized by an energy density, per unit cross section area, immensely superior to the one achievable even with the most powerful conceivable radar system.

On the other hand, optical observations have other limitations, also resulting from the physics of the observation process. Because the source of light illuminating the satellite/debris is indeed the Sun, an essential requirement is that the object is outside the shadow cone of the Earth. Moreover, the optical ground sensor cannot operate unless the ground station is inside the same shadow cone and the object elevation needs to be greater than a fixed value, such as 15 degrees, allowing for a reasonable air mass, avoiding unacceptable seeing values. These limitations must be joined to the effect of the Earth's surface curvature.

The above described conditions on sunlight are quite restrictive: the orbiting objects all over the sky are illuminated only immediately after sunset and immediately before sunrise.

The best conditions to observe objects at as much smaller phase angles as possible are during the minutes just after sunset or before sunrise. Very small objects, down to some centimeters, are detectable only when they pass very close to the Earth shadow border, at minimal phase angle and thus during the small observability window after sunset or before sunrise. It is very critical to begin operations as soon as the Sky is dark enough to avoid background saturation of the images and, conversely, to stop operations as late as possible.

Another stringent requirement, needed for Near Earth Space survey and tracking activities in order to be effective in view of the fast growing of Space active Subjects, is dictated by the necessity to quickly reach a very high percentage cataloguing of the objects population down to object dimensions which represent potential catastrophic event generators in case of collision. Just to mention, this requirement translates in the need to cover up to more than 99% of all objects with diameter greater than 8-10 cm residing in the 1000-1400 km perigee altitude orbital belt. Corresponding figures can be expressed for higher orbital belts with a consequent increase of the object minimum diameter; Nonetheless this do not relax anyway the requirements on the optical sensor as this is compensated by the increase of the object distance.

Further, the increase of the object brightness observed at lower altitudes in optimal phase conditions, is compensated by the object apparent speed—which can reach up to $\frac{1}{3}$ deg/s in High LEO regions—. This causes the photons arriving from the object to be streaked over a row of detector pixels when the object image is taken, hence reducing the corresponding Signal to Noise ratio by a factor $1/T$—where T is the number of trailed pixels—.

By elaborating object trails, recorded in the image of the portion of the Sky where objects transited during the image acquisition, it is possible to obtain a set of orbital parameters of the observed object. In particular, the combination of the orbital parameters of at least two observed tracks belonging to the same object, taken either at different times or locations, allows the computation of the full set of parameters defining the object orbit, thus allowing its preliminary cataloguing.

In order to build up useful catalogue data, the orbit must be calculated with a very high precision, implying that the optical image of the object track must have high resolution, typically in the order of the arc second. Then, once an object is discovered and preliminary catalogued, a successive procedure of orbital refinement is necessary, either by exploiting further object tracks observed at successive times, either by tracking the object such as to keep its position fixed in a pixel of the image. This last approach, called tasking or follow-up, can be achieved by following the object in the Sky for the overall time of image acquisition—exposure time—with a proper motion of the telescope. This way one keeps the object image fixed either in a single or a few pixels, hence allowing photons to pile-up there and not to be distributed in a long streak.

In summary it is necessary to quickly build up and maintain catalogues of objects covering very high percentages of the population distributed in the different Near Earth Orbital Belts, by determining with high accuracy and continuously refining their orbital characteristic parameters.

This Scenario translates in the necessity to implement sufficiently large aperture telescopes, with very wide Field of View (FoV greater than 10 square degrees) and quick motion capability, while ensuring short exposure times (even shorter than 1 s) and fast repositioning (in a few seconds), necessary to quickly cover very wide portions of the Sky where observation conditions are optimal also for fainter objects. Further the optical sensors must provide seeing limited resolution optical resolution, necessary to obtain the required orbital parameter accuracy during the orbit determination process.

From a mechanical point of view it is required to implement swift dynamics and high stiffness structures, for the achievement of quick repositioning with very short vibration dumping cycles, hence providing very high pointing precision and tracking stability.

STATE OF THE ART

Despite the great number of telescope solutions adopted for astronomy and related activities, only a very restricted number of design architectures offer in principle the possibility to address some of the stringent optical requirements needed for the Space Surveillance Awareness purposes.

The development of telescopes with critical definition over a wide field noticed an important advance with the introduction of the Schmidt telescope. In fact, compared with a standard prime-focus telescope provided with a field corrector, the Schmidt telescope can produce good quality imagery over a remarkably wider field of view. The Schmidt architecture has therefore been used extensively for wide-field sky survey photography and represents a state of the art solution in the domain of wide field telescopes. [J. L. Synge, "The Theory of the Schmidt Telescope", J. Opt. Soc. Am., 3, 129-136, (1943); D. Lynden-Bell and R. V. Willstrop, "Exact optics—VI. Schmidt cameras and prime correctors", Mon. Not. R. Astron. Soc. 387, 677-688 (2008)].

One of the main advantages offered by a Schmidt architecture is represented by the application of a spherical mirror as primary reflective element: spherical primary mirror receives light that has passed through a thin a-spherical lens, called a correcting plate, that compensates for the image distortions produced by the primary mirror itself.

From the design point of view the main advantage of the Schmidt architecture resides in the fact that the Field of View of a spherical mirror has no field-dependent aberrations; every point in the field is identical because a spherical mirror has no unique optical axis.

On the contrary, for a parabolic primary, the spherical aberration is zero for all radii, but coma produces a degradation of the off-axis images, which deteriorate linearly with its displacement from the centre of the field. In a standard Schmidt telescope, as a direct consequence of the spherical curvature of the primary lens, a field-corrector plate is normally placed in the centre of curvature of the primary mirror, which role is to transform the incident wavefront so that after reflection from the mirror it becomes spherical, directing rays to a single point.

Besides all the advantages offered by the introduction of the primary spherical mirror surface, which is the simplest and most accurate shape that can be produced also on large diameter elements, it must be also emphasized that the production of a correspondingly large plate corrector (a 0.9 m Schmidt telescope normally requires a 0.6 m corrector plate) is a both very time cost consuming task and represents in fact one of the most critical steps in the telescope production: in practice, in the realization of a telescope to be based on the Schmidt architecture, the corrector plate can become the actual key element, and result in a very demanding effort, when relatively large diameters are needed.

The curvature of the focal plane resulting in the Schmidt configuration poses serious problems in the application of standard planar technology based sensors such as CCDS, CMOS, etc. Further, the image detector, is located within the telescope tube, generating pupil obstruction and in general not easy accessibility conditions, in particular when cooling or even cryogenic conditions are required, (as in the most common operating situations), for the image detector operation. A final element to be remarked is the meaning of the term wide Field of View in a Schmidt configuration: this has to be meant not greater than about ten square degrees when a resolution not better than three arc-seconds is required over the whole observed field.

Different variations of the simple Schmidt telescope architecture, have been proposed. A particularly interesting modified Schmidt architecture is the so called Concentric Schmidt-Cassegrain. Schmidt-Cassegrain Telescope is a Cassegrain-like two-mirror system combined with a full-aperture Schmidt corrector. Various combinations of corrector separation and mirror conics are possible, with somewhat different image field properties. An all-spherical Schmidt-Cassegrain Telescope is corrected only for spherical aberration, with low astigmatism, as well as relatively strong field curvature and coma remaining. The corrector also induces low level sphero-chromatism. This solution is a deviation from the flat-field concept, in that its image surface is more than negligibly curved. In this configuration both mirrors are spherical: consequently coma and astigmatism are corrected, the latter implying that the two radii of curvature, for the primary and secondary mirror, are not identical. In order to cancel off-axis aberrations, the aperture stop (which is placed at the corrector) needs to be at the centre of curvature of primary mirror. All three surfaces, (that of the final image, primary and secondary mirrors), are concentric, with the centre of curvature at the vertex of the aperture stop (corrector).

Since the image curvature is also identical to that in a comparable Schmidt camera, the only advantages of the concentric arrangement are accessible image and reduced system length. Also, due to more strongly curved secondary, the arrangement allows for somewhat smaller minimum secondary required for accessible image.

A further variant of the Schmidt Cassegrain telescope is represented by the compact Baker-Schmidt design, which illustrates requirements and performances of an all-corrected Schmidt-Cassegrain system with the stop (i.e. the corrector) moved significantly closer to the primary. As a result, off-axis aberrations of the fast primary mirror are very significant, particularly coma. Canceling these aberrations requires that both mirrors are aspherized: in particular the fact that needed conic is for both an oblate ellipsoid doesn't make fabrication any easier. Strongly aspherized primary nearly triples the amount of under-correction of corresponding sphere with the secondary offsetting only a smaller portion of it. Compensating that much of spherical aberration requires significantly stronger correctors. Strongly aspherized primary also generates enormous amount of higher-order spherical aberration, again, only in small part compensated by the opposite aberration on the secondary. Compared to a Schmidt camera of identical focal ratio, a compact Baker-Schmidt has higher sphero-chromatism. Combined with its augmented fabrication difficulty, it makes the compact Baker-Schmidt camera a less favorable option performance-wise, despite its size advantage.

Schroeder proposed a tilted version of the Baker-Schmidt telescope, constituted by all reflective elements [D. J. Schroeder, "All-reflecting Baker-Schmidt flat-field telescopes", Appl. Opt., 17(1), 141-144 (1978)]. Schroeder analyzed both a tilted Baker-Schmidt Telescope configuration and the same architecture when the corrector plate is constituted by a reflective surface, hence producing an All Reflective Baker-Schmidt telescope. This configuration represents at some extent the maximum that a traditional Schmidt based architecture can perform in terms of field extent vs optical quality, reaching a theoretical resolution of better than 3 arc-seconds over a near 10 square degrees FoV. The introduction of off-axis surfaces poses serious problems in alignment and thermal control when such concept should be adopted for relatively large aperture structures operated at natural ambient conditions (temperature excursions, etc.), not to mention the huge series of issues related to large aperture aspherical shapes production and check.

A first attempt to produce a deeper correction of the fundamental aberration contributions, was operated through the introduction of a Tertiary Mirror. A solution was presented by R. V. Willsrop [Royal Astronomical Society, Monthly Notices, vol. 210, Oct. 1, 1984, p. 597-609.]. The aim of this new design was to give a field of up to 6-8 square degrees with image resolution smaller than the seeing (say 0.5 arc-seconds in good conditions), a focal surface with no more than moderate curvature to which glass plates might be bent as in a Schmidt camera, a fast focal ratio to allow sky-limited exposures, and compact optical arrangement to allow a small and relatively inexpensive dome to be used, leading to the so called Paul-Baker design. The essential feature of this design is that the second mirror is spherical, so the light is not exactly parallel after the first two reflections, but is deviated in just the same way as by the corrector lens of a Schmidt camera. Then the third mirror must also be spherical to focus the light, and a relatively large field of view with sharp images is obtained. This telescope has also been called the Mersenne-Schmidt. This configuration, due to the required bending of the optical plates is not useful for modern sensor chips (CCDs, CMOS, etc.), unless a degradation of the image is accepted. Further it doesn't prevent the introduction of large dimension aspherical mirrors in case relatively large apertures are required.

The introduction of further aspherized surfaces was originally proposed by Korsch [ D. Korsch, Appl. Opt. 11(12), 2986-2987, (1972); D. Korsch, Appl. Opt. 16(8), 2074-2077, (1977); D. Korsch, Appl. Opt. 19(21), 3640-3645, (1980)] and consists of a three mirror configuration, called as Three Mirror Anastigmatic (TMA). Several three-mirror telescopes were proposed before TMA but none of which provided a very practical and useful solution. The main shortcomings where to ascribe to scarce accessibility of the image plane, a large central obscuration, practically invariable fast focal ratios, or largely asymmetric configurations.

The Korsch configuration presents some key features that permit light to be extracted from a the TMA and directed to a potentially large focal plane located away from the telescope axis. The primary-secondary configuration resembles the Cassegrain, forming a real image closely behind the primary. This secondary image is then reimaged by a tertiary mirror at approximately unit magnification. A small, flat mirror placed at the exit pupil, which is located between the primary mirror and the tertiary mirror, folds the light perpendicularly away from the axis of the telescope where the final image is formed. With the Korsch arrangements, the bulk of the focal plane and its ancillary equipment need not shadow either the pupil or the field.

Since the original design proposed by Korsch, many variants have been proposed due to the wide application that TMA architecture has known, demonstrating the possibility to produce nearly diffraction limited imaging instruments over very wide FoVs. Nevertheless, due to the very short Cassegrain focal length to be adopted and the large subsequent magnification, the optical tolerances of both the front-end portion (primary and secondary) and the rear end (tertiary relay mirror) are tightened, which can be an issue in telescopes subject to environmental stresses.

Because the focal plane directly views the front end optical train through the hole in the extraction mirror, the stray light treatment for the outer baffle, inner baffle, and secondary mirror baffle becomes critical.

Annular field TMAs have been described by Korsch: this optical system uses three powered mirrors plus one flat extraction mirror. The main advantage of the annular field TMA, is the very complete stray light baffling that its accessible exit pupil permits. But the disadvantages of such configuration are consequences of the close working distance between the exit pupil and the focal plane leading to an image which is strongly non-telecentric and suffers from significant distortion.

In recent year, due to the very wide reachable FoV, off-axis TMAs configurations have encountered particular favor. One of the main advantages offered by this configuration relies in all the characteristics which can be offered by TMA architectures with a fundamentally unobstructed FoV. In this view, when considering large aperture telescopes, the issues related to large surfaces asphericization and the complexity required for the alignment process as well as for its maintenance, as required by TMAs, must be strongly assessed in the overall telescope pros and cons budget, particularly when ground based applications are targeted. In this last case, in particular, for which the natural seeing constraints render inappropriate an optical design pushed toward diffraction limit as TMAs can provide, though the very wide FoV can represent a very attracting characteristics, one has also to consider all the issues related to deployment and maintenance in very variable environmental conditions.

A breakthrough concept was introduced in the very recent years by R. Ragazzoni, addressing the problematic of very large diameter class telescopes, with the introduction of the so called Fly-Eye Concept [R. Ragazzoni et al., 'A Smart Fast Camera', Proc. SPIE 5492, 121 (2004); G. Gentile et al., Wide-field imaging on 8- to 100-meter class telescopes', Proc. SPIE 6269, 62695V (2006)].

A fast camera design (including wide-field corrector) must provide: a large FoV (that physically translates into large optics); a fast focal ratio for proper sampling with currently available pixel sizes (that translates into the choice of a Prime Focus station or to a Focal Reducer in a second focal station); the capability to compensate for relatively large FoV-dependent aberrations (that leads to the adoption of a number of optical elements to control simultaneously the wavefront distortions, often requiring complex aspheric surfaces involved in the optical design) and a physically large detector area (that translates into the adoption of a certain number of large format buttable CCDs). In actuality, most of the issues listed above are simply a consequence of the first: by reducing the FoV requirement all the technical drawbacks cited above are substantially reduced if not eradicated altogether. In particular, a focal reducer for a small FoV can be achieved with simple optics and, as soon as a pupil plane is made available, this can be used to compensate aberrations that are expected to vary slowly within such a small FoV. In practice the basic principle consists in replicating a relatively small FoV focal reducer on a bi-dimensional matrix, eventually allowing one to cover a much larger FoV. One can then cover the FoV with an array of similar lenslet focal reducers. In the case reported by Ragazzoni a wide field imager to a full field of view of 3 degree in diameter (c.a. 7 square degrees) was presented: the lenslet focal reducers differ in the type of pupil plane aberration corrector chosen, that is a function of focal plane radial position. Such lenslet system is placed in the Cassegrain focus of the telescope and a mosaic configuration of detector chips is foreseen.

This architecture still relies in a Cassegrain model, therefore with conical mirrors applied and with a focal plane presenting stringent contingency aspects, when considering the population of detectors to be applied. This solution is of course dictated by the very large aperture of the telescope to which it was addressed and would not be convenient when directly transferred to lower aperture telescopes, for which mosaic chip configurations are detrimental due to the many contingency issues posed by chip proximity, circuitry and conditioning assemblies and control.

Some optical systems designed to obtain wide FoVs can be found in literature also in application fields which are completely different from the technical field of the Invention. For example multiple camera systems allowing to observe different FoVs based on separate non-contiguous mirrors have been proposed [P. S. Smith, 'Multi-Camera Image-Production and Control', U.S. Pat. No. 2,896,503 (1959)], nevertheless the non-contiguity of the planar mirror configuration forcedly produces gaps in the observed FoV due to the thickness of the mirrors, furthermore each camera insists on a distinct entrance aperture, making this approach impracticable when large apertures are needed as every camera would require a dedicated one, thus creating a very huge apparatus unviable to be translated in a Telescope concept.

Another example of an optical systems conceived to observe multiple FoV is given by star imagers, in particular in [M. V. Mantravadi et al. 'Strapdown Stellar Sensor and Holografic Multiple Field of View Telescope Therefor' U.S. Pat. No. 5,206,499 (1993)] a solution is reported by substituting the traditional Schmidt Plate Corrector with an holographic plate positioned in the aperture of the system. This solution allows to place different focal planes observing through the holographic plate at different angles, but in this case too, large apertures render the system impracticable as the elements necessary to produce the image on the different focal planes must be of comparable dimensions. This produces a very huge apparatus as soon as the number of required focal planes grows and is due to the fact that the system is in practice a composition of multiple Schmidt telescopes sharing the same corrector, with a replication of the primary mirror. Furthermore due to the extension of the mirrors applied to generate the different focal planes the overall field of view cannot be continuous, but rather with gaps corresponding to half the solid angle subtended by each spherical mirror surface with respect to the centre of the holographic plate minus the observed field of view. In fact the produced Focal Planes array de facto decomposes the curved Focal Plane of a classical Schmidt telescope in segments which are interlined by consistent angular gaps. It is also clear that in such a system, optical resolution can be limited in case of simple star tracker applications, an unsuitable characteristic for the field of application of the Invention.

SUMMARY OF THE INVENTION

The innovative architecture of the telescope described in this document, based on the Fly-Eye concept, allows to circumvent the limitations imposed by state of the art solutions, in particular permitting to cover a continuous FoV greater than 10 square degrees and up to more than 44 square degrees with an optical resolution better than one arc second over the whole FoV. Huge Fov and high optical resolution, two aspects which are potentially opposite, are therefore combined in the present Invention.

The invention consists in a:

Telescope with wide Field of View greater than ten square degrees, comprising a spherical primary mirror, equipped with a system of continuous repartitioning of the Field of View, placed in proximity of the focus of the primary mirror and constituted by n planar reflective surfaces and by a corresponding number of correctors positioned after such repartitioning system.

The main characteristics arising from this novel architecture are the following:

1. With respect to a traditional Schmidt architecture the portion of the Focal Plane that are obtained are flat, due to the correctors placed after the Field of View partitioning system, contrarily to the Schmidt solution which produces a curved Focal Plane, not suited for modern planar technology semiconductor sensors, which cannot be bent.

2. The innovative configuration allows the application of distinct correctors (which can be both identical or different depending on the functionality that is required on the dedicated portion of the Field of View) for each Field of View portion produced by the repartitioning system. Such correctors are therefore of very reduced dimensions with respect to the central corrector required for a traditional Schmidt configuration, where such aspheric corrector, placed in the centre of curvature of the primary mirror, has dimensions comparable to the telescope entrance aperture, a characteristics which creates many implementation difficulties when the required entrance aperture must be of relevant diameter.

3. With respect to a traditional Schmidt the sensitive elements collecting the images of each single n-th portion of the Field of View are placed externally to the telescope aperture, hence avoiding obstruction and offering easy access and operation. This is particularly convenient when a cooling system must be associated to the sensitive element, a situation which is always critical for the conventional Schmidt configuration.

4. In each of the n portions of the Field of View generated by the planar reflective surface system, an independent single photodetector chip camera is applied, allowing to register the image of the corresponding Field of View portion with the required optical resolution. This element offers either high modularity—as in the case that all the cameras or a subgroup of them are identical—, either the possibility to apply different cameras, provided with dedicated optical elements hence allowing different functionalities in the different portions of the Field of View, such as for example in the case of spectrometric applications.

5. Due to the spherical symmetry of the primary mirror, in case the n portions in which is partitioned the overall field of view are identical in shape, then the corresponding n cameras can be all identical, with the consequent implementation of a highly modular system easy to implement and maintain.
6. This configuration of n planar reflective surfaces contiguous one to the other allows to observe a continuous very wide Field of View, greater than ten square degrees—but even up to some tens of square degrees—with an optical resolution down to seeing limited values or better.
7. With respect to multiple mirrors configurations, this novel architecture applies only spherical an planar reflecting surfaces, hence avoiding aspherical mirror shapes with all related issues concerning production, alignments and operation, in particular when relatively large entrance apertures are required. Further the primary mirror has no holes or blind areas that stop part of the impinging light, but has rather a continuous reflecting spherical surface which is completely exploited for light collection.

The above listed characteristics produce the following advantages:

1. The subdivision of the field in n portions has as a consequence that the correctors are correspondingly subdivided in n reduced portions, with a consequent strong reduction in the physical dimensions of each corrector element. The reduction of the dimensions of the correctors allows to implement them either by exploiting standard off the shelf optical elements (lenses) or alternatively to apply lenses which are of easy standardization. This approach, though maintaining enhanced performances, implies a strong reduction of the costs and can lead to batch series production.
    1.1. The novel concept architecture allows to apply a fast primary optics, which results in enhanced sensitivity (light collection capability) and in compact and stiff overall telescope structure, suited in quick dynamics applications, for the fast scanning of vast Sky portions.
    1.2. Due to their reduced dimensions, the correctors can be integrated with opto-mechanical elements providing the correct alignment within the accuracies offered by conventional precision mechanics, not requiring fine adjustments to each component, hence allowing fast assembly. Further the optical systems constituting the correctors can be easily equipped with self-compensating holding frames, defined by exploiting the different CTEs of the constituting materials, allowing to automatically compensate the external temperature excursions for actual operation also on a wide range of natural environmental conditions (summer, winter, different latitudes and altitudes, etc.)
    1.3. Single photodetector chip—either dedicated or off-the-shelf—independent telecameras can be applied in the sub focal planes corresponding to the different portions produced on the Field of View, allowing then a fast readout of the collected images, for applications of rapid scansion of the Sky, with a considerable reduction of the readout noise, when compared to classical mosaic configurations.
2. The presence of a single photodetector chip element for each portion of the overall Field of View avoids all the issues related to mosaic configurations, such as chip contingency, reciprocal chip co-planarity, eventual cooling and thermal insulation, etc, giving rise due to the continuity of the overall FoV, to an ideal Frameless Mosaic equivalent configuration
    2.1. The possibility to avoid a photo-detector chip mosaic configuration of the Focal Plane—as each sub portion of the overall Focal Plane is reduced enough to host a single chip element—allows to obtain a continuous coverage of the overall observed Field of View, without introducing gaps due to chip frames, circuitry and conditioning apparatuses, allowing in principle a hundred percent correlated fill factor.
    2.2. Every modular camera can be provided with a fast shutter, eventually equipped with a precise clock system, to obtain precise spatial-temporal measurement of the observed objects. This characteristic is a key element for instrumental performances of high precision measurement.
    2.3. Every modular camera can be provided with dedicated optical elements such as filters, polarisers, wavelength dispersive elements, etc., allowing to implement different functionalities for different applications in the different portions of the observed Field of View.

BRIEF DESCRIPTION OF THE FIGURES

FIG. 2-6 show a detailed example of an embodiment covering a FoV larger than 44 square degrees.

DETAILED DESCRIPTION OF AN EMBODIMENT OF THE INVENTION

Figures 1, 2A, 2B:
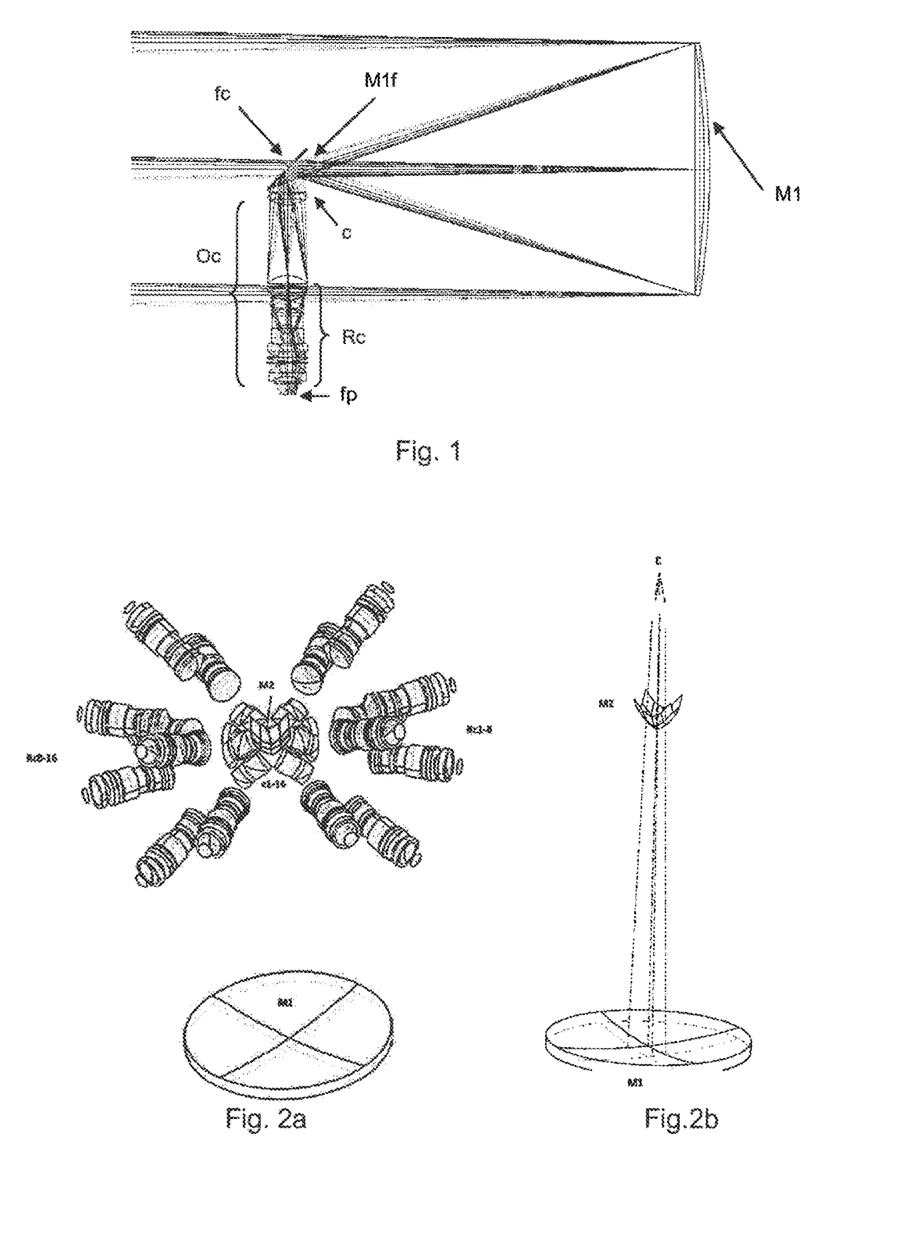
FIG. 1 shows an embodiment of the invention

Figure shows a Schematics of a possible embodiment of the invention. A single n-th portion of the overall structure is represented: due to the spherical symmetry of the primary this can be replicated n times to obtain a corresponding n-times FoV. (M1) primary spherical mirror; (M1$f$) primary mirror focus; (fc) rhomboidal planar mirror (n-th facet); (Oc) n-th optical camera with correctors (c) and refocusers-correctors (Rc); (fp) n-th focal plane.

The schematics of one possible embodiment is reported in FIG. 1, where the optical design of a singular equivalent portion of the FoV is represented. Light impinging in the primary mirror (M1) from different angles, is focussed on a rhomboidal flat mirror (fc)—placed near the primary focus (M1$f$)—which redirects the rays towards an optical camera system (Oc), bearing the correctors (c) and the optical lenses (Rc), correcting and refocusing, necessary to produce an image of the portion of FoV in the corresponding portion of the focal plane (fp), where the n-th image collecting and recording element is placed.

The rhomboidal shape of the planar mirror (fc) placed near the focus (M1$f$) of the primary mirror (M1), allows to insert here n replicas of it, just tilted by the necessary angle, but contiguously, hence forming a multifaceted prismatic reflector, with planar facets, which consequently allows to cover a corresponding n-times continuous Field of View. Further, the rhomboidal shape reflects in a square spot fingerprint in the focal plane, perfectly suited for single chip element.

In the reported example configuration, a single portion produced by a single rhomboidal flat mirror, covers an overall 1.675°×1.675° sub Field of View, with an optical resolution of better than 0.7 arc seconds.

The optical resolution is given by the applied optical camera lens system (Oc), whereas the FoV is defined by the Effective Focal Length of the telescope (i.e. at the Focal Planes) and by the area of the spot print of the rhomboidal facets (fc), in the corresponding Focal Plane (fp).

In fact, following an elementary optical relationship that is remembered here for the reader's convenience, the scale size of a squared area of side length d (expressed in meters), placed in the focal plane of a telescope, corresponds to a FoV, s (expressed in arc seconds), which is defined by:

$$s = 206265 * d/f$$

where f is the Effective Focal Length of the telescope, expressed in meters.

In the reported example, the Effective Focal Length at the Focal Plane is f=2 m, hence a 15×15 µm² squared area, as are typical pixel dimensions of commercial CCD modules, corresponds to a 1.54×1.54 square arc seconds FoV.

In the reported design every single camera hosts a 4k×4k pixel sensor module, with a 1.54 arc seconds pixel scale, therefore producing the above reported 2.8 square degrees sub Field of View, over a total 6×6 cm² Focal Plane Area.

The schematics reported in FIG. 1 is therefore a single element which can be replicated n-times in order to produce a larger FoV through their combination.

A detailed example of embodiment is described in FIGS. 2-6, where the schematics of a system provided with a faceted prism with sixteen such facets (fc) (each one covering a 2.8 square degrees sub Field of View) is reported.

FIG. 2a shows the overall embodiment architecture with a spherical primary mirror (M1), a secondary multi-faceted mirror prism (M2), composed by 16 facets (fc1-16), a set of 16 correctors (c1-16) located around the M2 prismatic mirror and the corresponding 16 refocusing-correcting elements (Rc1-16) providing 16 equivalent focal planes in each of which a distinct 1/16 of the overall FoV is imaged.

The application of a spherical mirror as primary (M1) allows to exploit the spherical symmetry as all axes passing from the M1 centre of curvature C (FIG. 2b), are equivalent optical axes insisting on the primary surface from a different angular direction.

Figure 3:
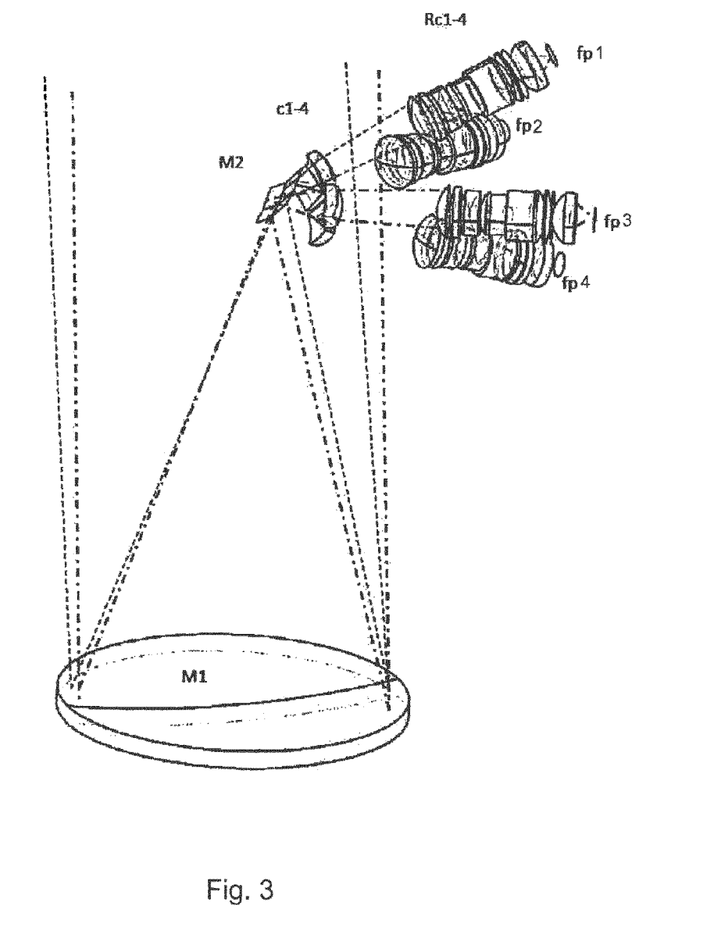

This is shown in detail in FIG. 3 where one fourth of the overall architecture is represented showing that rays coming from different directions are imaged in distinct single pixels in the pertinent focal planes (fp)

Figure 4:
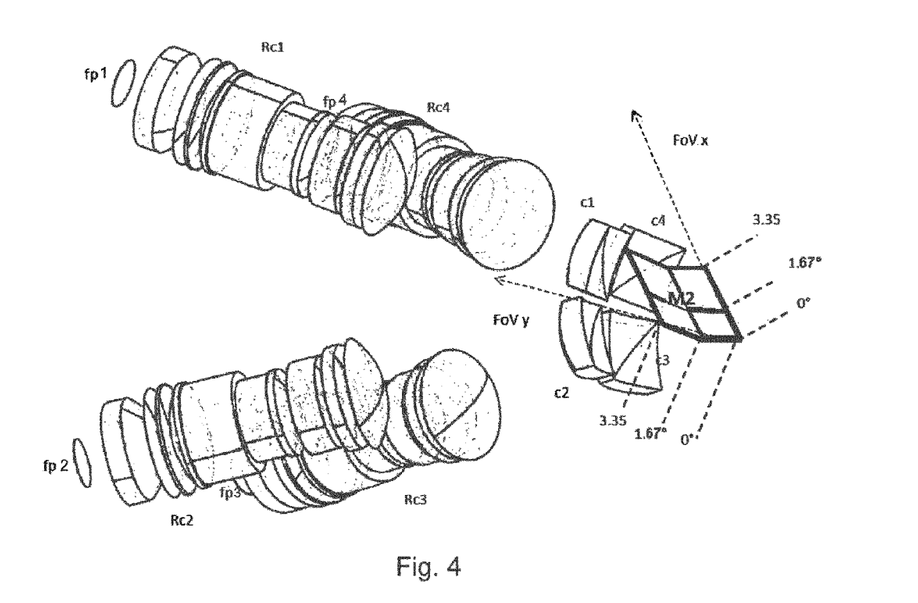

FIG. 4 reports a detail of one fourth of the Fly-Eye architecture implemented in the reported embodiment, showing how a 3.35°×3.35° FoV (¼ of the overall FoV reported in FIG. 2) is split in four sub FoVs each 1.675°× 1.675° wide, by means of the reflective prismatic mirror M2.

Figure 5:
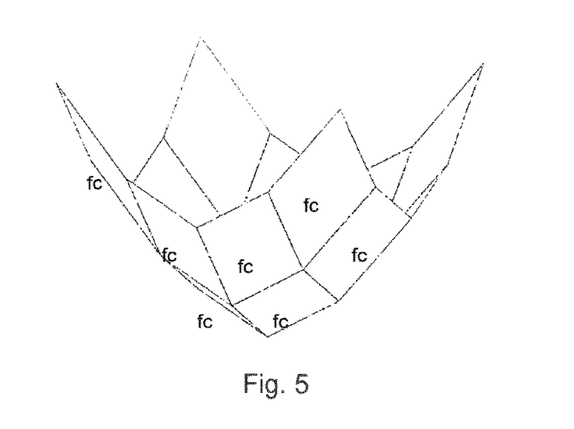

FIG. 5 represents the prismatic faceted mirror M2 necessary for splitting the overall 6.7°×6.7° FoV of the reported embodiment in sixteen equivalent portions each one corresponding to a 1.675°×1.675° sub FoV. The continuity of M2 surface ensures the continuity of the overall 6.7°×6.7° FoV even if every 1.675°×1.675° sub FoV is imaged in a distinct focal plane (fp).

The above reported example of embodiment allows to cover a continuous Field of View, overall greater than 10 square degrees up to more than 44 square degrees and with a better than 0.7 arc seconds resolution over the whole field.

Figure 6A:
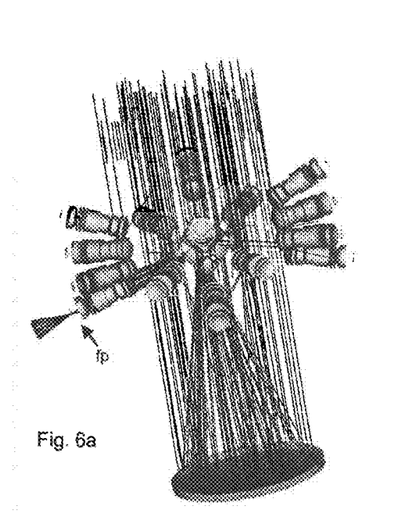
Figure 6B:
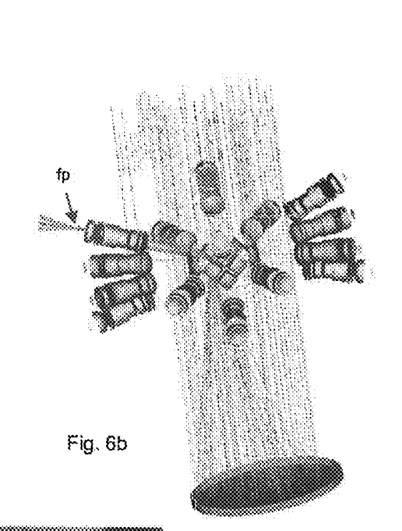

In FIGS. 6a and 6b the ray tracing of two different sources coming from different directions, each expressly selected to belong to distinct portions (distinct fp) of the overall FoV, is represented, showing that every source is imaged in a different focal plane, all directions being equivalent due to the symmetry of the M1 spherical mirror. Further FIG. 6c clearly shows that all rays impinging in the primary mirror coming from the same direction are focused in a single pixel of the corresponding focal plane fp.

Figure 6C:
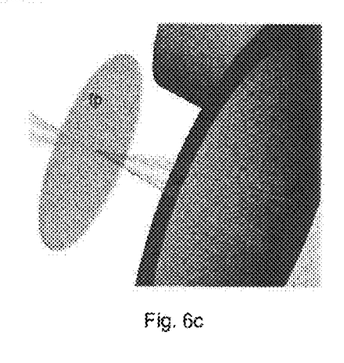

This way all rays coming from one direction are focussed in a single facet of the secondary faceted mirror M2 and imaged in a single distinct FP, moreover as the pixel scale is greater than the reached resolution, all rays coming from the same direction are imaged in a single pixel of the corresponding focal plane (FIG. 6c).

The continuity of the field is warranted in this case by the contiguity of the mirroring rhomboidal planar facets, whereas the resolution homogeneity is warranted by the fact that n replicas (16 in that case) of the single camera are applied, each one offering the specified optical quality over its dedicated Field of View portion.

The prismatic reflector M2 is not focused in the image focal planes fp, therefore its effect on the image is not an occultation of a part of the FoV, but results just in a reduction (central obstruction) of the total light flux arriving at each focal plane—as ordinarily occurs in all multiple mirror based telescopes—which can be easily compensated by a slight increase of the primary mirror M1 diameter.

The reported one is just an example of embodiment, as different configurations can be defined on the Field of View partitioning system, by selecting the proper focal length, pixel size, flat mirrors areas, number and configuration, hence allowing to continuously cover at will very wide Fields of View—both in isometric and non-isometric way— with seeing limited or better optical resolution, and characterised by the required geometrical shapes.

The invention claimed is:

1. Telescope with high optical resolution and continuity of the field of view comprising a spherical primary mirror, characterized by the fact
   a) that said telescope is equipped with a wide field of view,
   b) that said telescope is equipped with a system of repartitioning of the field of view,
   c) that said system of repartitioning of the field of view is placed in proximity of the focus of the primary mirror, and is constituted by a secondary mirror composed by n planar reflective surfaces,
   d) that said n planar reflective surfaces are contiguous one to the other and form a continuous multifaceted prismatic reflector, in such a way as to obtain continuity of the field of view over the whole field,
   e) that said n planar reflective surfaces are followed by a corresponding number of optical cameras that form n portions of image in n distinct focal planes,
   f) that said n portions of image are partially overlapping,
   g) that on each n-th focal plane is positioned a collecting and recording element,
   h) that each one of the n facets of the secondary mirror has a rhomboidal shape, and that each one of such rhomboidal facets of said secondary mirror is itself a planar mirror.

2. Telescope with high optical resolution and continuity of the field of view according to claim 1 characterized by the fact that in each n-th focal plane the collecting element is a single chip camera.

3. Telescope with high optical resolution and continuity of the field of view according to claim 2 characterized by the fact that all cameras or a subset of them are identical.

4. Telescope with high optical resolution and continuity of the field of view according to claim 2 characterized by the fact that all cameras or a subset of them are different.

5. Telescope with high optical resolution and continuity of the field of view according to claim 2 further comprises corrector lenses, and wherein there are 16 planar reflective surfaces, corrector lenses, and single chip cameras.

6. Telescope with high optical resolution and continuity of the field of view according to claim 5 characterized by the fact that the field of view of each single camera is of 2.8 square degrees.

7. Telescope with high optical resolution and continuity of the field of view according to claim 6 characterized by the fact that the overall field of view is continuous and is greater than 44 square degrees and that the resolution is better than one arc second on the overall field of view.

8. Telescope with high optical resolution and continuity of the field of view according to claim 2 characterized by the fact that every modular camera is provided with a fast shutter, equipped with a precise clock system.

9. Telescope with high optical resolution and continuity of the field of view according to claim 1 further comprises corrector lenses that are equipped with self-compensating holding frames.

\* \* \* \* \*